2,847,793

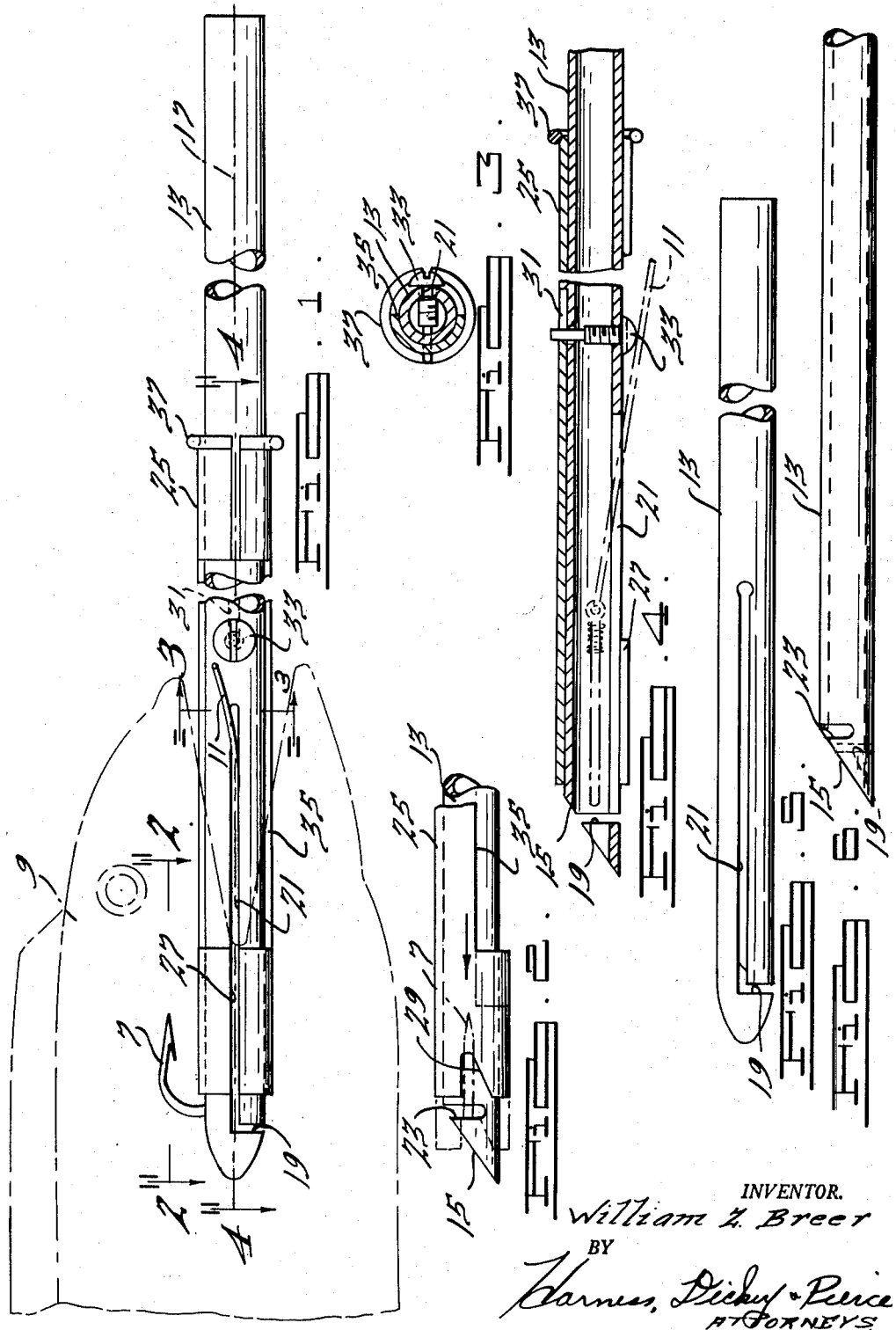

FISH HOOK DISGORGER

William Z. Breer, Grosse Pointe Park, Mich.

Application March 19, 1956, Serial No. 572,554

3 Claims. (Cl. 43—53.5)

This invention relates to a fish hook disgorger.

It is well-known by fishermen that a fish hook often becomes lodged within a fish and it is often extremely difficult, if not impossible, to remove the fish hook without the use of special tools or a fish hook disgorger. While in the past many fish hook disgorgers have been developed, these have not proven completely satisfactory in that they are either difficult to use, ineffective in use, or relatively expensive to manufacture.

It is an object of this invention to provide a fish hook disgorger which is extremely simple in construction, which is easy to use, and which is extremely effective in quickly removing a fish hook which is lodged within a fish.

It is a still further object of this invention to provide a fish hook disgorger of the aforementioned type in which the disgorger may be easily associated with a fish hook leader, guided into the interior of a fish and into engagement with a fish hook, and thereafter positively connected with a fish hook so that the fish hook may be easily removed and will not become accidentally disengaged from the disgorger.

These and other objects of this invention will become apparent from the following detailed description taken in conjunction with the accompanying drawing, in which:

Figure 1 is a side view of the fish hook disgorger of this invention connected with a fish hook within a fish, but with the outer tubular member in its retracted position;

Fig. 2 is a fragmentary elevational view of the structure illustrated in Fig. 1 looking in the direction of the line 2—2 thereof;

Fig. 3 is a sectional view of the structure illustrated in Fig. 1 taken along the line 3—3 thereof;

Fig. 4 is a sectional view of the structure illustrated in Fig. 1 taken along the line 4—4 thereof;

Fig. 5 is a side elevational view of a further embodiment of the invention; and

Fig. 6 is a top elevational view of the structure illustrated in Fig. 5.

Referring now to the drawing, it will be seen that a fish hook 7 is illustrated as being lodged or caught within a fish 9, and the fish hook has connected therewith, in a conventional manner, a leader 11 formed of plastic or the like, the diameter of which is normally smaller than the diameter of the fish hook.

In order to remove the embedded fish hook from the interior of the fish, the disgorger of this invention is provided and is illustrated as including an inner tubular member 13 which may be formed in any suitable manner and of any suitable material. That is, it may be formed from a piece of tubing or from a stamping, and is preferably made of corrosion-resistant material, such as copper-plated steel or the like. One end 15 of the tubular member 13 terminates in a plane which is disposed at an acute angle to the longitudinal axis 17 of the tubular member 13, thus providing an angled end at one end of the tubular member. A slot 19 extends circumferentially inwardly from the angled end 15 of the tubular member, generally perpendicular to the longitudinal axis 17 of the member, and terminates at its inner end in a longitudinally extending slot 21, the innermost end of which terminates intermediate the opposite ends of the tubular member. The slots 19 and 21 are of a width to receive and accommodate the leader 11, and while the slots are of a width to accommodate a range of leader diameters, it will be appreciated that they are preferably of a width less than the diameter of the fish hook 17 so that the fish hook cannot, under ordinary circumstances, enter the slot 19. A third slot 23 extends circumferentially inwardly from the angled end 15 of the tubular member 13 adjacent the innermost portion thereof. The slot 23 is preferably circumferentially spaced from the slot 19 and is disposed inwardly or rearwardly of this slot. The slot 23 is preferably wider than the slot 19 and is adapted to receive and accommodate the fish hook 7. It will be appreciated that the slot 23 is preferably wide enough to receive and accommodate fish hooks of varying sizes. It, likewise, will be appreciated that the fish hook disgorger may be made in one size to accommodate small and medium sized fish hooks and of another size to accommodate large fish hooks.

A second tubular member 25 is slidably supported on the tubular member 13 for longitudinal sliding movement relative thereto. The tubular member 25 is illustrated as having a longitudinal slot 27 therein disposed in alignment with the slot 21 in the tubular member 13. The leading or forward end of the tubular member 25 is provided with a notch or recess 29 which is disposed in alignment with the inner portion of the slot 23 so that when a fish hook is fully seated in the slot 23 and the tubular member 25 is advanced, the leading end of the tubular member 25 will encompass the slot 23 so as to retain the fish hook within the slot 23 and prevent its disengagement therefrom until the tubular member 25 is moved to its retracted position.

Frictional engagement between the inner tubular member 13 and the outer tubular member 25 is preferably provided, and this may be accomplished by putting a bend or kink in the outside tubular member, or providing a dimple or the like in one of the members to frictionally engage the other. Means are preferably provided to limit relative movement between the inner and outer tubular members, and in the instant case, an elongated slot 31 is provided in the outer tubular member into which one end of a screw 33 extends. The opposite side of the outer tubular member 25 has a portion of the wall cut out or removed at 35 so as to reduce surface contact area between the inner and outer tubular members, decreasing cleaning requirements and sticking problems, and in the illustrated embodiment to provide clearance for the head of the screw 33 which is connected with the inner member 13. The inner or rear end of the member 25 is knurled or provided with a handle in the form of a ring 37 to enable it to be easily actuated by a user.

In operation, when a fish hook is lodged within a fish, the leader is of course projecting from the fish's mouth. The outer sleeve or tubular member 25 is disposed in its retracted position and the disgorger is employed by inserting the leader in the slot 21, through the slot 19. The disgorger is then pushed forwardly into the interior of the fish and will be guided on the leader and the leader will not become disengaged from the disgorger because of the angular slot arrangement. When the forward end 15 of the tubular member 13 engages the bight portion of the fish hook so that the disgorger cannot be moved further into the fish, the disgorger is rotated in a clockwise direction. The fish hook will thus be guided by the angled end 15 on the tubular member 13 down into the slot 23, and when the disgorger cannot be rotated further because the fish hook is fully seated in the slot 23, the fisherman pushes the outer tubular member 25 outwardly or forwardly to its advanced position so that the notch or recess 29 at the leading end of the tubular member 25 will receive the fish hook and the leading end of member 25 will retain the fish hook in the slot 23. It will be appreciated that the slot 23 acts to retain the fish hook against movement longitudinally of the tubular member 13, while the wall of the outer tubular member recess 29 prevents movement of the fish hook circumferentially out of the slot. With the disgorger thus connected to the fish hook, the fisherman can withdraw the disgorger from the fish and pull the fish hook therefrom. After the fish hook has been removed from the fish, the fisherman can retract the outer tubular member 25 and then remove the fish hook from the slot 23 and disconnect the leader from the disgorger through slot 19, thus freeing the hook for subsequent use.

It will, therefore, be appreciated that the fish hook disgorger illustrated and described is relatively simple in construction and will positively engage a fish hook so that the same may be easily withdrawn from the fish and then easily disconnected from the disgorger.

In the embodiment of the invention illustrated in Figs. 5 and 6, a fish hook disgorger is illustrated which is less expensive in construction than the fish hook disgorger previously described and which comprises merely the inner tubular member 13 previously described. This tubular member is constructed in substantially the same manner as previously described in that the slots 19, 21 and 23 are provided adjacent the angled leading end 15 of the tubular member 13. This disgorger is connected to the fish hook and the leader in the same manner as previously described. That is, by disposing the leader in the slot 21 through the slot 19 and inserting the disgorger into the fish until the leading end 15 abuts the bight portion of the hook, the hook can be connected with the disgorger by rotating the tubular member until the fish hook is seated in the slot 23. Thereafter, by withdrawing the tubular member 13 and keeping a clockwise rotational force thereon, so as to retain the fish hook in a fully seated position in the slot 23, the hook can be removed from the interior of the fish. It will be appreciated that while the construction of this embodiment is much less expensive than the other embodiment, there is a danger of the hook moving out of the slot 23 unless the rotational force is continually applied, while with the device of the previous embodiment, the fish hook is positively locked to the disgorger.

What is claimed is:

1. A fish hook disgorger comprising an elongated tubular member having the leading end thereof terminating in a plane disposed at an acute angle to the longitudinal axis of the tubular member, said member having a narrow first slot therein having its longer dimension extending circumferentially inwardly from said angled leading end in a plane transverse to the longitudinal axis of said member, said member having a second narrow slot communicating at one end with the inner end of said first slot, said second slot having the longer dimension thereof extending generally parallel to the longitudinal axis of said member, said slots being of a width to receive a fishing hook leader so that said member can be guided by the leader to bring the angled leading end of said member against a fish hook disposed within a fish, said member having a third slot extending circumferentially inwardly from said angled leading end adjacent the rearmost portion of said end, said third slot being adapted to receive a fish hook, said angled leading end of said member defining a guide for said hook, whereby when said member is rotated relative to the hook the hook will be guided into said third slot, and a second tubular member movably sleeved on said first tubular member and having a recess adjacent one end thereof disposed in alignment with at least a portion of said third slot and adapted to retain a fish hook in said third slot when said second member is moved to an advanced position, whereby the hook can be removed from a fish by withdrawing the disgorger from the fish, said second member being movable to a retracted position to permit said hook to be removed from said third slot.

2. A fish hook disgorger comprising an elongated tubular member having the leading end thereof terminating in a plane disposed at an acute angle to the longitudinal axis of the tubular member, said member having a narrow first slot therein having its longer dimension extending circumferentially inwardly from said angled leading end in a plane transverse to the longitudinal axis of said member, said member having a second narrow slot communicating at one end with the inner end of said first slot, said second slot having the longer dimension thereof extending generally parallel to the longitudinal axis of said member, said slots being of a width to receive a fishing hook leader so that said member can be guided by the leader to bring the angled leading end of said member against a fish hook disposed within a fish, said member having a third slot extending circumferentially inwardly from said angled leading end in an opposite circumferential direction from said first slot and adjacent the rearmost portion of said end, said third slot being adapted to receive a fish hook, said angled leading end of said member defining a guide for said hook whereby when said member is rotated relative to the hook the hook will be guided into said third slot, and a tubular sleeve slidably supported on said tubular member and having a slot therein disposed in alignment with said tubular member second slot, said sleeve having means adjacent one end thereof adapted to encompass a portion of said third slot so as to retain a fish hook therein when said sleeve is moved to an advanced position and adapted to permit the fish hook to be disengaged from said third slot when said sleeve is moved to a retracted position.

3. A fishhook disgorger comprising an elongated tubular member having the leading end thereof terminating in a plane disposed at an acute angle to the longitudinal axis of the tubular member, said member having a narrow first slot therein having its longer dimension extending circumferentially inwardly from said angled leading end in a plane transverse to the longitudinal axis of said member, said member having a second narrow slot communicating at one end with the inner end of said first slot, said second slot having the longer dimension thereof extending generally parallel to the longitudinal axis of said member, said slots being of a width to receive a fishing hook leader so that said member can be guided by the leader to bring the angled leading end of said member against a fishhook disposed within a fish, said member having a third slot extending circumferentially inwardly from said angled leading end adjacent the rearmost portion of said end, said third slot being adapted to receive a fishhook, said angled leading end of said member defining a guide for said hook, whereby the hook will be guided into said third slot by said angled leading end, and a second member movably mounted on said first member and having a slot adjacent one end thereof movable into and out of over-lapping relationship with said third slot to releasably retain a fishhook in said third slot, whereby the fishhook can be removed from a fish by withdrawing the disgorger from the fish.

References Cited in the file of this patent

UNITED STATES PATENTS

| | | |
|---|---|---|
| 2,164,907 | Falkner | July 4, 1939 |
| 2,493,142 | Hutton | Jan. 3, 1950 |
| 2,519,098 | Aye | Aug. 15, 1950 |
| 2,608,785 | Hall | Sept. 2, 1952 |
| 2,644,268 | Klinicki | July 7, 1953 |
| 2,670,561 | Howorth et al. | Mar. 2, 1954 |
| 2,688,816 | Bondesen | Sept. 14, 1954 |
| 2,777,244 | McKinley | Jan. 15, 1957 |